Jan. 7, 1958 P. C. HUTCHINSON 2,818,766
METHOD FOR OIL ANALYSIS
Filed July 11, 1955

INVENTOR.
Paul C. Hutchinson
BY
W. H. Hamilton
ATTORNEY

United States Patent Office 2,818,766
Patented Jan. 7, 1958

2,818,766

METHOD FOR OIL ANALYSIS

Paul C. Hutchinson, Lexington, Mass., assignor to Baird Associates, Inc., Cambridge, Mass., a corporation of Massachusetts Application July 11, 1955, Serial No. 521,252

3 Claims. (Cl. 88—14)

This invention relates to a method for spectrographically analyzing fluid bodies to determine therein the presence of metals and, in particular, the invention is concerned with detecting the occurrence of particles of metals which are commonly used to constitute the bearing surfaces of engines.

It is well known that undesirable engine wear occurring at certain bearing surfaces of an engine is accompanied by the abrading away from the bearing surfaces of very small colloidally sized particles of the bearing metals. However, the extent of wear may be slow and the abrasion may occur in very small degree for a time, at least and, therefore, furnishes only slight traces of the particles. This makes it extremely difficult to detect the presence of such particles, for example, in the oil which has been used to lubricate the bearing surfaces during a specific period of operation of the engine.

It is an object of the invention to devise a method for analyzing fluid materials and detecting colloidally sized particles which may be present in the lubricating oil of an engine. It is especially an object to collect particles of worn bearing metals in suitable amounts for achieving qualitative determinations by spectrographic methods so as to furnish an indication as to whether or not excessive wear may or may not be taking place at the bearing surfaces from time to time.

These and other objects will be more fully understood and appreciated from the following description of a preferred embodiment of the invention selected for purposes of illustration and shown in the accompanying drawings, in which—

The present invention is based on the observation that bearing wear produces an abrasion of metal particles of colloidal size which are present in the crank case oil of the engine. From this there has originated the inventive concept of collecting these colloidally sized particles from the oil in some suitable collecting body which can be subjected to the process of spectrographic analysis wherein the metal particles are electrically excited and visually inspected. I have found that this process may be successfully carried out by employing an absorbent carrier body such as carbon or graphite which is capable of absorbing oil and colloidally sized particles in the oil.

In accordance with the invention, I have devised a method of supporting the absorbent material in engine oil during operation of the engine so that small but significant amounts of metal particles may be collected. For the purpose of supporting the absorbent body in oil, I have devised sample collecting carbon discs of annular shape which are specially formed to withstand electrical excitation at the analytical gap of a spectrometer and I have further designed holder means for receiving the discs and locating them in a desired position with respect to a crank case or other enclosure in which oil is circulated.

In the structure shown in the accompanying drawing, numeral 2 denotes a tubular fitting which is formed at opposite ends with threaded apertures into which may be threaded connectors 4 and 6. These connectors may be removed to permit the fitting to be connected into the oil pump line of a motor or some other oil circulating portion of the lubricating system for a motor or similar mechanism in which lubrication is required.

Figure 1:
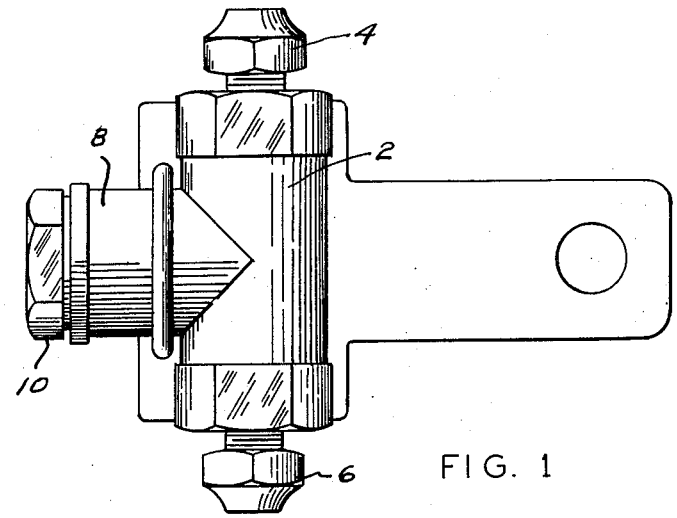
Fig. 1 is a side elevational view of apparatus employed in carrying out the oil analysis method of the invention.
Figure 2:
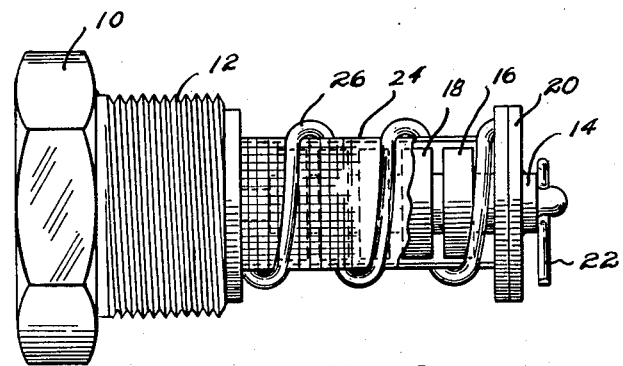
Fig. 2 is a view further illustrating means for supporting a plurality of carbon discs in an oil body.

Intersecting the central body portion of the tubular member 2 is another tubular extension 8 (Fig. 1) which communicates with the interior of the tubing 2 and which has threaded into it a carbon disc and holder assembly which may, for example, include the parts as shown in Fig. 2. Numeral 10 denotes a hexagonal head for a threaded plug 12 which is further constructed with a reduced spindle end 14 on which are mounted the carbon discs 16, 18, etc., in spaced relation. A retaining plate 20 is detachably secured over the spindle by a pin 22. The carbon discs are preferably enclosed by a protective screen 24 which serves to keep coarse material from coming into contact with the carbon discs. Also, the screen is surrounded by a helical guard wire 26 having its ends secured as shown.

This threaded holder may be threaded into the fitting 2 in a position to locate the carbon discs in the path of flow of oil passing through the system and metal particles in colloidal size are picked up and absorbed by the carbon discs.

In thus collecting colloidal metal particles, I find that improved accumulation is achieved by reason of the fact that, with the engine running and the oil in a relatively hot state, its viscosity is decreased and better absorption will take place. By supporting a carbon disc in the hot oil, it is believed that a continual exchange of oil may take place and new oil will be continually replacing oil within the disc at a much faster rate than can occur with the oil at relatively lower temperatures. Since it may be assumed that the porous carbon body has an affinity for colloidal metallic particles, it follows that oil being displaced from a given disc will have smaller amounts of the metal impurities included therein as compared with fresh amounts of oil entering the disc. In other words, the disc is designed to operate somewhat as a carbon trap and accumulation of metal particles takes place within the disc.

I find that, by taking advantage of this accumulation process in hot oil, a significant determination may be arrived at within relatively short periods of operation of the engine and, from evaluating a series of carbon discs such as has been shown in Fig. 2, for example, all of which are subjected to the same conditions and period of accumulation, there may be derived an average value of colloidal metal particles present in a given motor operation where the percentage of colloidal metal particles has reached an appreciable percentage factor as a result of bearing surface wear.

Utilizing this as a basis of operation, the carbon discs may be inserted and removed at certain intervals and subjected to electrical excitation in a spectrometer to detect small quantities of colloidal metal particles which are known to be in the bearing surfaces and may thus furnish a definite indication as to whether or not bearing wear of undesirable nature may be taking place.

Figure 3:
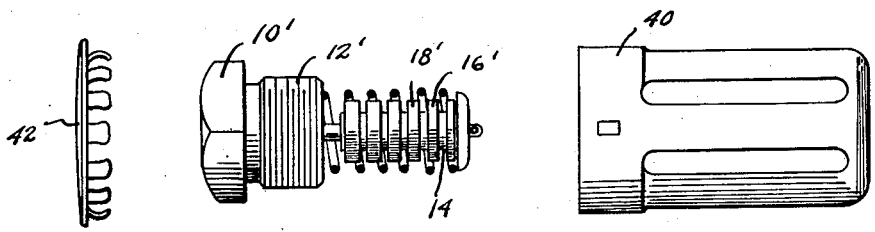
Fig. 3 shows another form of oil sampling means.

In immersing the carbon disc assembly in hot oil such as is present in an engine under normal running conditions, I may utilize a fitting such as that shown in Fig. 1 which may be connected, for example, by means of the connectors 4 and 6 between two separated ends of an oil pumping line in the motor. In Fig. 2, I have shown a carbon disc assembly which corresponds to that employed in the fitting of Fig. 1 but with the difference that the threaded plug section is removed and used independently of any fitting part, being merely substituted for the crank case drain plug with the threaded base section 12 being threaded into the opening of the crank case drain. Similarly, various other points of installation and means of supporting a carbon disc assembly may be resorted to varying with the different types of motors and their lubrication systems. In furnishing the carbon disc assemblies for test purposes, it may be desirable to contain them in a suitable protective casing of some type and, in Fig. 3, I have shown a plug with a threaded base 12' and a hexagonal head 10' having a spindle 14' on which are mounted carbon discs as 16', 18', etc., and this assembly may be contained within a slotted housing 40 having a spring cap 42, as noted. Such a container furnishes a convenient means of holding the device prior to use and also protectively containing the carbon disc assembly after it has been removed from an oil system and prior to its being spectrographically analyzed.

By means of the method and apparatus disclosed, it will be seen that I have provided a desirable way of detecting and qualitatively analyzing bearing wear in various types of motors and, from the determinations thus obtained, it is possible to prevent undesirable wear and severe engine injury such as necessitate expensive repairs and replacement.

While I have disclosed this method of colloidally sized metal particles analysis for lubricating oil of a motor, I may desire to practice the method and apparatus in analyzing other fluid bodies, such as aqueous mixtures, chemical fluids and the like.

I claim:

1. That improved method which comprises collecting small metallic particles of colloidal size occurring in the lubricating oil of an engine in an absorbent body which is supported in the stream of the lubricating oil as it circulates through the said engine, and spectrographically analyzing the particles for determining the abrasion of engine parts as a result of wear.

2. A method according to claim 1 in which the absorbent body is supported in the crank case of the said engine.

3. A method according to claim 1 in which the absorbent body is supported in the oil pumping line of the said engine.

References Cited in the file of this patent

UNITED STATES PATENTS

| | | |
|---|---|---|
| 1,061,368 | Gilliam | May 13, 1913 |
| 1,248,452 | Caen | Dec. 4, 1917 |
| 1,829,001 | Geromanos | Oct. 27, 1931 |
| 2,043,053 | Martin | June 2, 1936 |
| 2,187,514 | Gardner | Jan. 16, 1940 |
| 2,344,719 | Nusbaum et al. | Mar. 21, 1944 |
| 2,706,928 | Lee et al. | Apr. 26, 1955 |

OTHER REFERENCES

Carlson et al.: "Determination of Trace Metallic Components in Petroleum Oils" in Analytical Chemistry, vol. 22, September 1950, pages 1118 to 1121.

Sennstrom: "How Spectrographic Analysis Controls Diesel Engine Maintenance" in Railway Mechanical and Electrical Engineer, April 1952, pages 65 to 68.